Patented Feb. 28, 1939

2,148,905

UNITED STATES PATENT OFFICE 2,148,905

METHOD FOR THE TREATMENT AND UTILIZATION OF SCRAP OR WASTE LEATHER

Armand Robert Horowitz, Brooklyn, N. Y., assignor to Webwood Corporation, New York, N. Y.

No Drawing. Original application December 23, 1936, Serial No. 117,319. Divided and this application May 20, 1937, Serial No. 143,760

2 Claims. (Cl. 18—48)

This application for patent is a divisional application with respect to application Ser. No. 117,319, filed Dec. 23, 1936, for Methods for the treatment and utilization of scrap or waste leather, in regard to which application division has been required.

The invention relates to new and useful improvements in methods for the treatment and utilization of scrap or waste leather, whereby a composition is produced which has all the characteristics of leather, and which can be cut or moulded into various shapes, lengths, and sizes, so as to be utilized for the purpose for which leather is generally and at present used, but principally for boot and shoe leather.

At the present time scrap leather left over from the manufacture of different leather articles is wasted, and it is the object of this invention to regenerate this waste material so as to use the same as a commercial and marketable product.

In achieving the above object, the general outline of the procedure is as follows: A predetermined quantity of scrap or waste leather is by the aid of suitable chemicals or machinery ground or reduced into a coarse powder. The next step in the process is to mix this ground leather with an adhesive, which latter will serve the purpose of commingling the various particles together, whereupon pressure is applied to form the mixture into a solidified mass of great strength and to render it waterproof.

More particularly, and as an illustrating example, the steps undertaken by me in achieving the above result, are as follows:—

A quantity of scrap or waste leather is reduced into a fine powdered form, by boiling the same in a solution, preferably 1%, of sodium hydroxide until it forms a jell, then precipitating the latter by the addition of cold water to a jellied batch, after having run off the original liquids in which the leather batch was cooked; the material is then forced to dry thoroughly by the application of any suitable means, such as drying pans, whereupon it will appear as a solid, coarse, brittle powder, which is next reduced to a very fine powder by means of any suitable grinding apparatus, for instance, a pebble mill. To this finely powdered mass is added an adhesive of a quickly drying composition, consisting of virgin or scrap of waste cellulose acetate, or scrap or waste nitrocellulose fibre, dissolved in a quantity of acetone suitable in measure for the required purpose, viscosity usually or approximately 8 parts cellulose acetate or nitro-cellulose to 8 parts acetone for highly viscous concentrated and economical binder, in or about the proportions, as follows:—

1. Chemically treated leather: 16 ozs.,—cellulose acetate cement, 12 ozs. solution, liquid form.

2. Chemically treated leather: 16 ozs.,—nitrocellulose acetate 12 ozs.

The above combinations of materials will require no vulcanization.

In moulding articles from the above materials about 7000 pounds pressure is required per square inch; in said moulding process, however, no heat is required.

It may be noted that maximum water-proofing is attained by knitting the fibres closely together by means of hydraulic pressure on a material that has been precoated with a cellulose binder, or a Bakelite binder, that are 100% waterproof materials.

While I have thus described my invention herein, it is to be understood that some slight variations, within the scope of the appended claims may well be made as to the steps undertaken in the process as well as to the amount or quantity of the several ingredients employed by me in obtaining the hereinbefore stated results, and I do not, therefore, wish to limit myself to the exact disclosure of my composition and the steps, relative to same, as mentioned herein.

What I claim as new, and desire to secure by Letters Patent of the United States, is:—

1. The process of manufacturing an article, as herein described, comprising the following steps: reducing a quantity of scrap or waste leather to a fine powder by boiling the same in a solution of 1% of sodium hydroxide to form a jell, removing from the leather batch the cooking liquid, adding cold water to the jellied batch, whereby to precipitate the latter, drying the material thoroughly, and reducing it to a fine powder, mixing the latter with an adhesive of a quickly drying composition, said composition consisting of cellulose acetate dissolved in acetone, and subjecting said mixture to a substantial pressure.

2. The process of manufacturing an article, as herein described, comprising the following steps: reducing a quantity of scrap or waste leather to powder by boiling the same in a solution of 1% of sodium hydroxide to form a jell, removing from the leather batch the cooking liquid, adding cold water to the jellied batch, whereby to precipitate the latter, drying the material thoroughly, and grinding it to a fine powdered mass, mixing the latter with an adhesive of a quickly drying composition, said composition consisting of 8 parts of cellulose acetate to 8 parts acetone, in relative proportion to the mixture, whereby to form a highly viscous concentrated binder, the mixture being subjected to a pressure of approximately 7000 pounds.

ARMAND ROBERT HOROWITZ.